United States Patent [19]

Stönner et al.

[11] Patent Number: 4,491,573

[45] Date of Patent: Jan. 1, 1985

[54] PROCESS FOR HEATING HYDROGEN

[75] Inventors: Hans-Martin Stönner, Schwalbach; Friedemann Marschner, Oberursel, both of Fed. Rep. of Germany

[73] Assignee: Metallgesellschaft Aktiengesellschaft, Frankfurt am Main, Fed. Rep. of Germany

[21] Appl. No.: 590,690

[22] Filed: Mar. 19, 1984

[30] Foreign Application Priority Data

Mar. 25, 1983 [DE] Fed. Rep. of Germany ....... 3310902

[51] Int. Cl.³ ............................................. C01B 3/26
[52] U.S. Cl. .................................... 423/652; 423/651; 423/653; 423/654; 423/655; 423/656; 568/885
[58] Field of Search ............... 423/651, 652, 653, 654, 423/655, 656

[56] References Cited

U.S. PATENT DOCUMENTS

| | | | |
|---|---|---|---|
| 2,524,840 | 10/1950 | Shapleigh | 423/651 |
| 2,759,799 | 8/1956 | Berg | 423/651 |
| 2,801,159 | 7/1957 | Carton et al. | 423/651 |
| 2,911,288 | 11/1959 | Viles | 423/651 |

Primary Examiner—J. E. Evans
Attorney, Agent, or Firm—Karl F. Ross; Herbert Dubno

[57] ABSTRACT

Desulfurized hydrocarbons are reacted with water vapor on catalysts at temperatures of 700° to 1200° C. to form a high-hydrogen product gas, which is separated in a pressure-swing adsorber into purified hydrogen and a separated gas, which contains substantially carbon oxides and methane. The purified hydrogen is supplied to a hydrogenating plant, which is operated at temperatures in the range of 250° to 500° C. and pressures of 200 to 400 bars. High-hydrogen gas from the hydrogenating plant flows in a pipeline through a heater and is then recycled to the hydrogenating plant. The heater consists of a fuelfired reheater, in which the separated gas is used as a fuel. The pipeline in which the high-hydrogen gas is recycled between the hydrogenating plant and the heater consists of an alloy steel, in which the carbon is combined in carbides with at least one of the alloying constituents chromium, molybdenum, tungsten or vanadium.

6 Claims, 1 Drawing Figure

U.S. Patent  Jan. 1, 1985  4,491,573
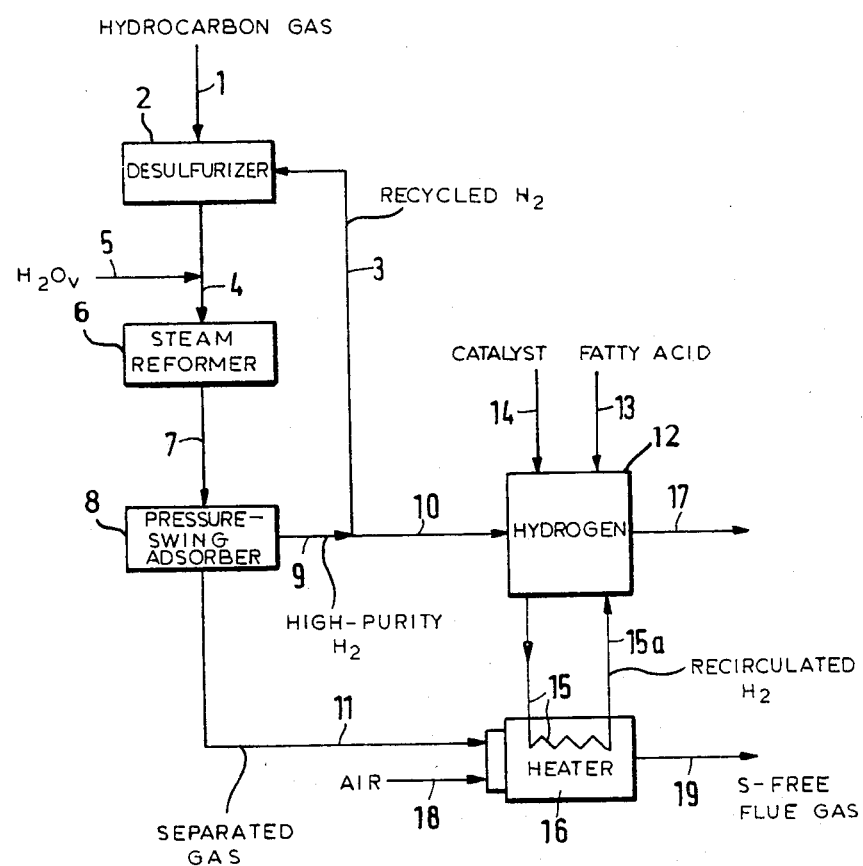

PROCESS FOR HEATING HYDROGEN

FIELD OF THE INVENTION

Our present invention relates to a process for heating hydrogen and, more particularly, to a process for the heating of hydrogen in conjunction with hydrogenation processes which require hydrogen at a pressure of 200 to 400 bars and a temperature of 250° to 500° C., e.g. in the hydrogenation of organic compounds which can be, for example, fatty acids in their conversion to fatty alcohols.

BACKGROUND OF THE INVENTION

It is known to produce a high hydrogen product gas by reacting desulfurized hydrocarbons with water vapor on appropriate catalysts and then to separate the resulting product gas in a pressure swing adsorber to yield a high-purity hydrogen which can be utilized directly for hydrogenation.

Hydrogenation plants can operate the hydrogen pressures of 200 to 400 bar and at hydrogen temperatures of 250° to 500° C. and generally in the course of hydrogenation a high hydrogen gas is withdrawn from the hydrogenation process, is heated and is recycled to the hydrogenation process.

However, problems arise in the heating of hydrogen at high pressures and temperatures because of the high hydrogen permeability of the metals forming the pipelines and vessels which are traversed by the hydrogen-containing gas. In general, not only is hydrogen lost by penetration through the walls of steel or the like but the carbon content of the steel can combine with hydrogen to form methane and result in embrittlement or even destruction of the pipeline or the steel structures.

The high pressures which are involved preclude the use of steels of the low-carbon austenitic nickel-chromium type because such material would stand only light tensile stresses. It is for this reason that carbon steels in the form of ferritic alloys having a high carbon content must be used. Obviously, the additional carbon has a higher affinity to the alloying components than to hydrogen so that the formation of methane can be avoided. These alloying components can be chromium, molybdenum, tungsten or vanadium.

While this might appear to solve the problem because the resulting alloys are suitable for use in hydrogen lines and have been successful for this purpose, nevertheless problems are encountered because these alloys are subject to corrosion by sulphur during prolonged operation and to the extent that the corrosion may result in breakage of the tube to the detriment of the plant and operating person. The problem is especially severe because the highly explosive hydrogen is at a pressure of 200 to 400 bar.

OBJECTS OF THE INVENTION

It is the principal object of the present invention to provide a method of the type described, i.e. for the processing of a sulphur-containing hydrocarbon fuel into hydrogen and for the operation of a hydrogenation plant including the heating of hydrogen whereby these disadvantages do not arise or in which these disadvantages are obviated.

Another object of the invention is to provide an improved method of heating hydrogen which precludes an attack by the hydrogen-containing gas on the materials of the pipeline or other vessels through which the heated hydrogen gas is conducted or in which the hydrogen is heated.

It is also an object of this invention to provide a hydrogenation process whereby the drawbacks of the earlier systems described are obviated.

SUMMARY OF THE INVENTION

These objects and others which will become apparent hereinafter are attained, in accordance with the invention, by a process which in its most basic sense can comprise the heating of hydrogen indirectly in a recirculation path from and to a hydrogenation stage to a temperature of 250° to 500° C. at a pressure of 200 to 400 bar in a high-carbon alloy-steel pipeline or through a heat exchanger wall by the combustion of a fuel recovered from the pressure swing adsorber in which the high-purity hydrogen is generated for use in the hydrogenation plant. This fuel gas, which may be referred to hereinafter as a separated gas, is the gas which is recovered from the pressure swing adsorber when the latter is depressurized and flushed after removal of the product gas.

It may be recalled that in a pressure swing adsorber system, during an initial phase of each cycle, the gas mixture, in the case of the present invention containing hydrogen and other combustibles, is passed into a pressure swing adsorber which retains the nonhydrogen constituents while passing substantially pure hydrogen as the pure product which can be delivered to the hydrogenation stage. Following the adsorption phase, the adsorber is subjected to a desorption phase which may comprise two successive stages, in the first of which the pressure is dropped and a portion of the previously retained components are desorbed to form a part of the separated or fuel gas. Thereafter, utilizing some of the hydrogen or some other flushing gas, the adsorber is flushed to form the remainder of the separated or fuel gas, these two portions of the fuel gas being burned in oxygen, air or other oxygen-containing gas in the hydrogen heater. The adsorption phase can include an evacuation if desired and before the cycle is begun again, the pressure of the adsorber is built up to the adsorption pressure.

The separated gas is completely free from sulphur, especially if the hydrocarbons which are reacted with water vapor prior to the pressure swing adsorption have been freed from sulphur by a conventional desulfurization step.

To the extent that the method of the present invention is a hydrogenation method, it can comprise the steps of desulphurizing a hydrocarbon feed with water vapor at a temperature of 700° to 1200° C., preferably with a water gas shift, to form a high-hydrogen product gas, separating in a pressure swing adsorber the high-hydrogen product gas to form a purified hydrogen and a separated gas, the latter containing substantial quantities of carbon oxides and methane, hydrogenating at least one feed stock with the purified hydrogen in a hydrogenating plant operating at a temperature of 250° to 500° C. and a pressure of 200 to 400 bar, recovering a high-hydrogen gas from the hydrogenating plant, passing it through a pipeline and recycling it to the hydrogenating plant, and heating the hydrogen along this pipeline in a fuel-fired reheater in which the separated gas is used as a fuel. Similar method steps can be utilized in the method of the invention for the generation of hydrogen at an elevated pressure and temperature and, most broadly, for the production of hydrogen heated in a pipeline at the aforementioned temperature of 250° to 500° C. and pressure of 200 to 400 bar.

The pipeline in which the high hydrogen gas is recycled and the heater can consist of an alloy steel in which the carbon is combined in carbides with one or more of the alloying constituents chromium, molybdenum, tungsten and vanadium.

The separated gas is free from sulfur compounds, which have been removed before from the hydrocarbons from which the hydrogen has been derived. The separated gases comprise combustible constituents consisting mainly of methane and carbon monoxide as well as small residual amounts of hydrogen and have a calorific value in the range of approximately 8000 to 9000 kJ/m$^3$ (STP). These separated gases might be used as a fuel which is fired for the endothermic reaction of the hydrocarbons with water vapor on an indirectly heated catalyst, e.g., a nickel catalyst. This concept is not adopted in the process according to the invention, in which the separated gas is used in a manner which is highly beneficial for the trouble-free operation of the plant.

The sulfur-free separated gas, which becomes available at an adequate rate, is used in the hydrogen heater. The gas which is burnt for the endothermic cracking may consist of a substitute fuel.

In accordance with the usual practice the high-hydrogen gas coming from the hydrogenating plant is heated in the heater to a temperature which is 50° to 150° C. above the temperature of the gas entering the heater. The high-hydrogen gas leaving the heater is at a temperature of 350° to 500° C., preferably 400° to 480° C., and at that temperature is recycled to the hydrogenating plant.

Hydrogen under these pressure and temperature conditions is circulated from and to the hydrogenation plant for the direct hydrogenation of fatty acids to fatty alcohols. That hydrogenation is effected in known manner by means of hydrogen on copper-chromium oxide catalysts, preferably at pressures of 250 to 350 bars and temperatures of 270° to 350° C. in a hydrogenating reactor. That process is known from Open German Application DE-OS No. 28 53 990, U.S. Pat. Nos. 3,180,893 and 4,259,536 and German Patent Publication DE-AS No. 11 12 056.

In that hydrogenating process the fatty acid and the catalyst slurry required for the hydrogenation must not be heated to the required reaction temperature of 270° to 330° C. before the meterials enter the reactor because in that case the fatty acid and the catalyst slurry might be decomposed. For this reason the additional heat required for the hydrogenation must be supplied to the reactor in the form of hot hydrogen. For that purpose the high-hydrogen hydrogenating gas leaving the hydrogenating plant is supplied to the heater and is heated therein to temperatures in the range of 350° to 500° C. and preferably of 400° to 480° C. and is then recycled to the hydrogenating plant.

Moreover, the contents of catalyst poisons, such as sulfur compounds, chlorine compounds, and carbon monoxide, in the hydrogen used for hydrogenating must be minimized. For this reason the hydrogen is desirably recovered in a purity of at least 99 vol. % by pressure-swing adsorption from the product gas produced by the catalytic reaction of the hydrocarbons.

BRIEF DESCRIPTION OF THE DRAWING

The above and other objects, features of and advantages of the present invention will become more readily apparent from the following description, reference being made to the accompanying drawing in which: the sole FIGURE is a flow diagram of a hydrogen-generating system for a hydrogenation plant embodying the method of the present invention.

SPECIFIC DESCRIPTION

Sulfur-containing hydrocarbons, such as natural gas or naphtha, are supplied in line 1 to a desulfurizer 2, which is operated in a manner known per se. The hydrogen required for the desulfurization is supplied in line 3. Desulfurized hydrocarbon vapors in a line 4 and water vapor from line 5 are supplied to a steam reformer 6, which can comprise a tubular heater, in which steam reforming is effected on an indirectly heated nickel catalyst at temperatures in the range of 700° to 1200° C. Known processes for that purpose are described in Open German Applications DE-OS Nos. 21 41 875 and 22 63 343 and in the corresponding U.S. Pat. Nos. 3,963,642 and 4,234,451. The steam reformer comprises also a water shift converter, which is known per se and in which $CO + H_2O$ is converted to $CO_2 + H_2$.

The product gas obtained by steam reforming and a subsequent shift conversion has approximately the following composition by volume on a dry basis:

| | |
|---|---|
| $H_2$ | 68 to 75% |
| CO | 2 to 5% |
| $CO_2$ | 18 to 22% |
| $CH_4$ | 3 to 6% |

In order to recover hydrogen having the highest possible purity from that product gas, the latter is supplied in line 7 to a pressure-swing adsorber 8, which is operated in accordance with the principle that has been described on pages 611/612 of Ullmanns Enzyklopadie der technischen Chemie, 4th edition, volume 2. The resulting hydrogen has a purity of at least 99.9 vol.% and is withdrawn in line 9. A partial stream of that hydrogen is supplied in line 3 to the desulfurizer 2 and the remainder is conducted in line 10 and used for the hydrogenation. In the pressure-swing adsorber 8, a separated gas which can be used as a fuel becomes available and leaves the adsorber in line 11.

The hydrogen conducted in line 10 is used in the fatty alcohol synthesizer 12, in which hydrogen and fatty acids, supplied in line 13, are used to produce fatty alcohols in the presence of catalyst material supplied through line 14. The process has been described, e.g., in German Publication DE-AS No. 11 12 056 and U.S. Pat. No. 4,259,536. Details of that process are not significant in the present context.

The high-hydrogen gas must be supplied from the synthesizer 12 in line 15 to a heater 16, in which the gas absorbs heat. The gas is subsequently recycled to the synthesizer 12 in line 15a, in which the gas has a temperature of 350° to 500° C. and preferably of 400° to 480° C. The fatty alcohol product is withdrawn from the synthesizer 12 in line 17.

The fuel burnt in the heater 16 consists of the sulfur-free separated gas in line 11. Combustion air is supplied in line 18. The heat generated by the combustion is transferred by indirect heat exchange to the hydrogen, which is supplied in pipeline 15. The pipes which constitute the lines 15 and 15a are subjected to special conditions and for this reason consist of alloy steels, which may contain the following alloying constituents (Balance Fe):

| | |
|---|---|
| C | 0.1 to 0.3 wt. % |
| Si | 0.2 to 0.5 wt. % |
| Mn | 0.3 to 1.5 wt. % |
| Cr | 1 to 15 wt. % |
| Mo | 0.2 to 1.5 wt. % |
| Ni | 0 to 1 wt. % |
| V | 0.1 to 1 wt. % |
| W | 0 to 8 wt. % |

It is particularly important that in steel which contains carbon all or most of said carbon is combined in carbides which will not be destroyed by an attack of hydrogen. As such alloys are susceptible to corrosion by sulfur, the sulfur-free fuel conducted in line 11 is particularly suitable for use in the heater 16. Sulfur-free flue gases leave the heater 16 in line 19.

SPECIFIC EXAMPLE

Fatty alcohols are produced from fatty acid in a process as illustrated on the drawing. Material at the following hourly rates flow through the several lines:

| Line | Material | Rate |
|---|---|---|
| 1 | Liquefied gas | 416 kg |
| 3 | Hydrogen | 26 m³ STP |
| 5 | Steam | 1827 kg |
| 7 | Cracked gas (dry) | 2017 m³ STP |
| 10 | Hydrogen | 1250 m³ STP |
| 11 | Separated gas | 560 m³ STP |
| 13 | Fatty acid | 5400 kg |
| 14 | Catalyst | 25 kg |
| 17 | Raw fatty alcohol (dry) | 5000 kg |
| 18 | Combustion air | 1176 kg |
| 19 | Sulfur-free flue gas | 1460 m³ |

Hydrogen under a pressure of about 300 bars is circulated through lines 15 and 15a, which are made of a steel designated as Material No. 1.4922 (in accordance with DIN). In the heater 16 the hydrogen is heated from 300° to 400° C.

We claim:

1. A method of heating hydrogen under a pressure of 200 to 400 bars to a temperature between 250° and 500° C. which comprises the steps of:
    (a) forming a hydrogen-containing gas by the catalytic reaction of desulphurized hydrocarbons with water vapor at a temperature of 700° to 1200° C.;
    (b) subjecting said hydrogen-containing gas to separation in a pressure swing adsorber to produce a high-purity hydrogen and a separated gas containing combustible constituents;
    (c) circulating hydrogen through a pipeline at a pressure of 200 to 400 bars; and
    (d) heating a recirculated hydrogen in said pipeline in a fuel-fired heater along said pipeline by combustion of said separated gas.

2. The method defined in claim 1 wherein the separated gas is the only fuel used in said heater.

3. The method defined in claim 1 wherein the hydrogen is heated in said heater to a temperature of 50° to 150° C. above the temperature of the hydrogen entering the heater.

4. The method defined in claim 3 wherein the hydrogen is heated in said heater to a temperature of 350° to 500° C.

5. The method defined in claim 4 wherein the hydrogen is heated in said heater to a temperature of 400° to 480° C.

6. The method defined in claim 1 wherein said pipeline and said heater consist at least in part of an alloy steel in which carbon is combined in carbides with at least one alloying constituent selected from the group which consists of chromium, molybdenum, tungsten and vanadium.

* * * * *